(No Model.) 2 Sheets—Sheet 1.

A. BÄRENZ.
BAKER'S OVEN.

No. 557,536. Patented Apr. 7, 1896.

WITNESSES:
Marcy J. Trusdell
Wm. C. Canfield, Jr.

INVENTOR:
ADAM BÄRENZ.
BY
Fred'k C. Fraentzel,
ATTORNEY (No Model.) 2 Sheets—Sheet 2.

A. BÄRENZ.
BAKER'S OVEN.

No. 557,536. Patented Apr. 7, 1896.

WITNESSES:

INVENTOR:
ADAM BÄRENZ.
BY
Fred'k C. Fraentzel,
ATTORNEY

UNITED STATES PATENT OFFICE.

ADAM BÄRENZ, OF NEWARK, NEW JERSEY.

BAKER'S OVEN.

SPECIFICATION forming part of Letters Patent No. 557,536, dated April 7, 1896.

Application filed August 29, 1895. Serial No. 560,841. (No model.)

*To all whom it may concern:*

Be it known that I, ADAM BÄRENZ, a citizen of the United States, residing at Newark, in the county of Essex and State of New Jersey, have invented certain new and useful Improvements in Bakers' Ovens; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has for its object to provide a baker's oven which shall be of such a construction that after the fire has reached the proper degree of heat there shall be no gases or smoke in the baking-chamber to injure the material, and, furthermore, a steam-boiler being used in connection with the oven to permit the introduction of steam into the baking-chamber and thereby producing a moist heat, which is of great benefit to the baker in the production of bread and the like.

The invention therefore consists in the improved oven, as shown, having the particular arrangement of heat-flues for conducting the heat to different parts of the oven and imparting a uniform heat.

The invention consists, furthermore, in the novel arrangement of the steam-boiler, the flues for conducting the fire and heat to the same, and a steam-pipe for introducing the steam into the baking-chamber.

The invention consists, furthermore, in certain minor features of construction and combinations of parts, such as will be hereinafter fully described, and finally embodied in the clauses of the claim.

The invention is illustrated in the accompanying sheets of drawings, in which—

Figure 1:
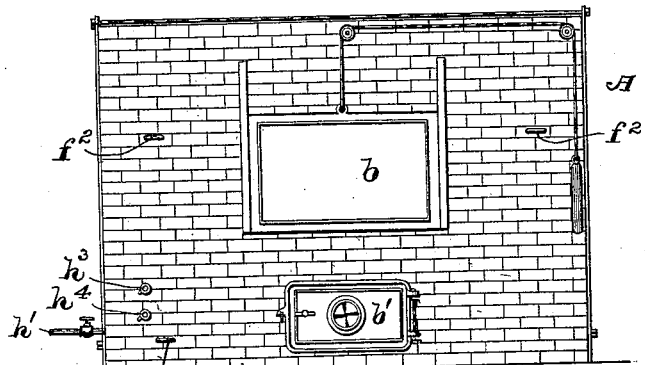
Figure 2:
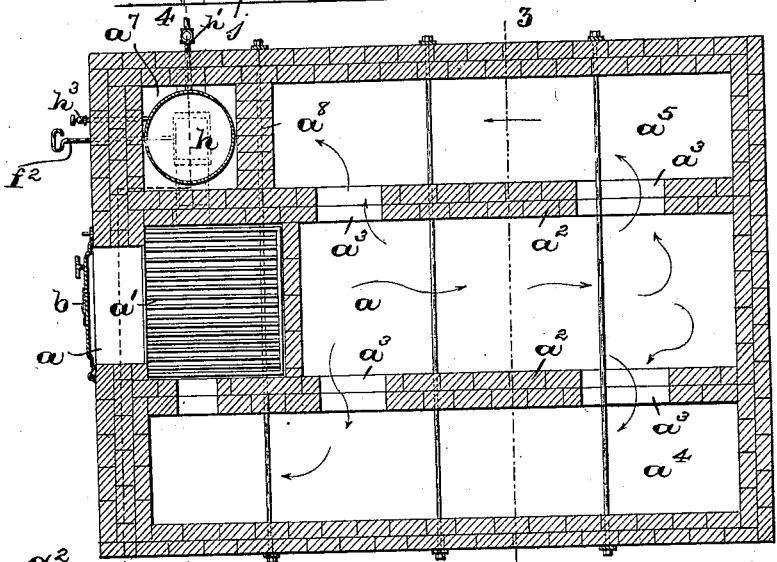
Figures 3, 4:
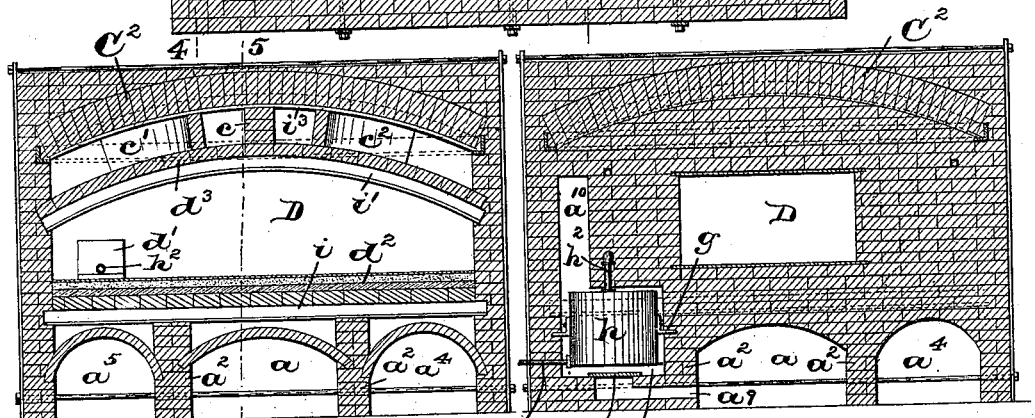
Figure 5:
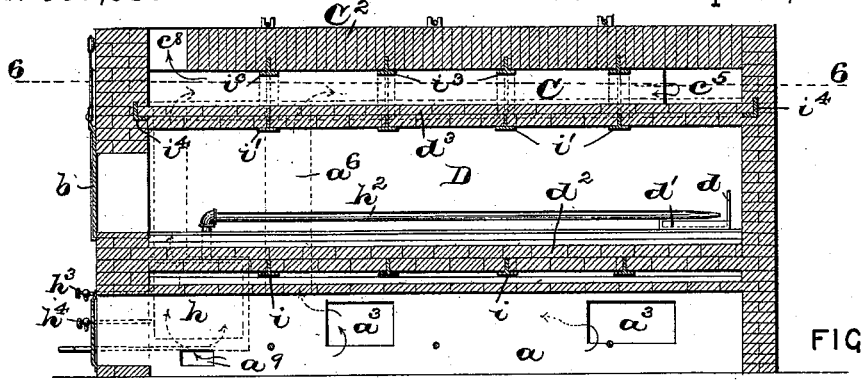
Figure 6:
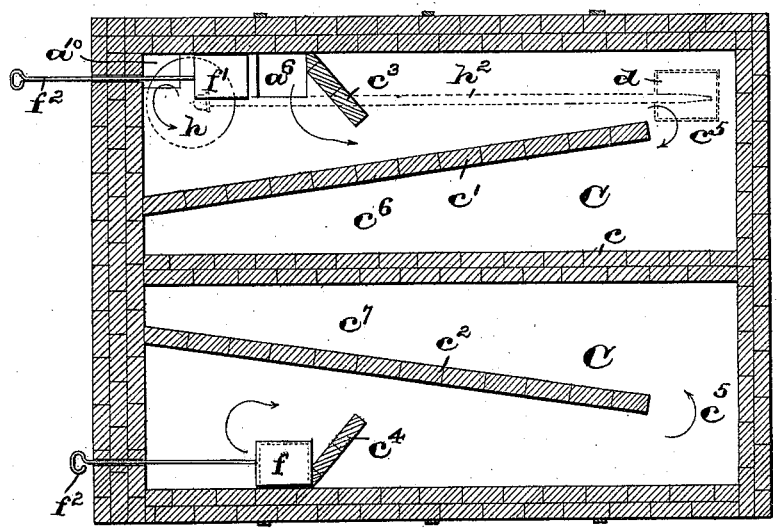
Figure 7:
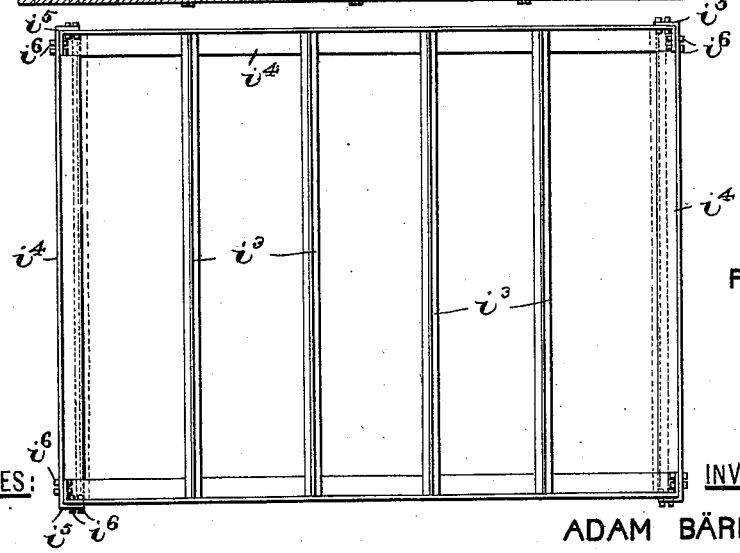

Figure 1 is a front view of the oven, and Fig. 2 is a horizontal section taken directly above the grate of the oven. Fig. 3 is a transverse vertical section taken on line 3 3 in Fig. 2, and Fig. 4 is a similar section taken on line 4 4 in said Fig. 2. Fig. 5 is a longitudinal vertical section taken on line 5 5 in Fig. 3, and Fig. 6 is a horizontal section taken on line 6 6 in Fig. 5. Fig. 7 is a plan view of the iron framework used in connection with my novel construction of baker's oven and which is intended for the purpose of supporting the top arch of the same.

Similar letters of reference are employed in each of the above-described views to indicate corresponding parts.

In said drawings, A indicates the complete oven; $a$, the fireplace of the same, provided with the grate $a'$, as will be more especially seen from Fig. 2. Suitable doors $b$ and $b'$ are employed in the front to close said parts. The fireplace $a$, as will be seen from Figs. 2 and 5, extends to the rear of the oven and is provided with walls $a^2$, having the openings $a^3$, which communicate with certain hot-air ducts $a^4$ and $a^5$. The hot air and products of combustion will pass from the fireplace $a$, in the direction of the arrows shown in said Figs. 2 and 5, through the openings $a^3$ into the ducts or flues $a^4$ and $a^5$, from which the hot air and gases escape through the vertical ducts or flues $a^6$ (indicated in dotted outline in Fig. 6) into the heating-spaces C and C', directly above the baking-chamber D of the oven. Said heating-spaces C and C', which are divided by the wall $c$, are also provided with the lateral inclined partitions $c'$ and $c^2$ and the short deflecting-walls $c^3$ and $c^4$, directly back of the vertical flues $a^6$, which communicate with the flues $a^4$ and $a^5$, as has been mentioned. The products of combustion emerging from said flues $a^6$ are deflected by the inclined walls $c^3$ and $c^4$ against the partitions $c'$ and $c^2$, passing through the openings $c^5$ into the portions $c^6$ and $c^7$, and out into smokestack through the opening $c^8$.

Suitable dampers $f$ and $f'$, provided with handles $f^2$, may be employed for closing the openings or ducts $a^6$, as will be clearly seen from an inspection of Fig. 6. By this means of connecting the fire-chamber $a$ directly with the space formed between the arched roof of the oven and the arched roof of the baking-chamber D both the top and bottom of said baking-chamber are thoroughly and properly heated, as will be clearly evident.

As will be seen from Figs. 2 and 4, I have provided the oven with a suitable space $a^7$, formed by a portion of the wall $a^2$, a wall $a^8$, and the outer walls of the oven. Said space $a^7$ is connected with the fireplace of the oven by a hot-air and fire conveying duct $a^9$, by means of which hot air and fire are caused to surround a suitable boiler $h$, and then pass through the vertical duct or flue $a^{10}$ into the upper heating-chamber C, as indicated in Fig. 6. Said boiler $h$ is supported on suitable brackets $g$ in said chamber $a^7$, and has a water-inlet pipe $h'$ and a steam-outlet pipe $h^2$, which is arranged at one side on the flooring of the baking-chamber D and blows the steam generated in said boiler $h$ into the said baking-chamber. To prevent any water that may be conducted with the steam into the chamber D from being blown over the bread or other material in said chamber, the steam is blown from the nozzle of said pipe $h^2$ against an upright plate $d$, and any water that may be blown against the same will drop into a suitable receptacle $d'$, where it is collected and finally evaporated by the heat in said chamber. The object of introducing the steam into said baking-chamber is to provide a moist heat therein, and thereby resulting in a better-baked bread or the like. The said boiler $h$ is provided with suitable gage-cocks $h^3$ and $h^4$ for determining the amount of water in said boiler. In order to shut off the heat from the fireplace into the portion or chamber $a^7$, the duct $a^9$ is provided with a suitable damper $j$, as will be clearly seen from Fig. 4.

The flooring $d^2$ of the baking-chamber D is supported on suitable T-irons $i$, which rest upon the upper portions of the walls $a^2$, and are thereby prevented from warping and sagging. The roof $d^3$ of said chamber D is supported by the curved T-irons $i'$, while the roof $C^2$ of the heating-chambers C and C' is supported by the T-irons $i^3$.

In Fig. 7 I have illustrated the manner of supporting said T-irons $i^3$ in the suitable angle-irons $i^4$, which are bent at right angles at their ends, as at $i^5$, and are secured together by suitable bolts or studs $i^6$, to prevent any longitudinal or transverse displacement. This framework is masoned in the brickwork of the oven and supports the arched roof in the manner clearly illustrated in Figs. 3, 4, and 5.

Having thus described my invention, what I claim is—

1. The combination, in a baker's oven, of a fireplace, a space $a^7$, and connecting-flue, a baking-chamber, and a steam-boiler in said space $a^7$, having a steam-pipe extending into said baking-chamber, and an upright plate $d$ in front of the discharge end of said pipe, substantially as and for the purposes set forth.

2. The combination, in a baker's oven, of a fireplace, a space $a^7$, and connecting-flue, a baking-chamber, and a steam-boiler in said space $a^7$, having a steam-pipe extending into said baking-chamber, and an upright plate $d$ and receptacle $d'$ in front of the discharge end of said pipe, substantially as and for the purposes set forth.

In testimony that I claim the invention set forth above I have hereunto set my hand this 28th day of August, 1895.

ADAM BÄRENZ.

Witnesses:
FREDK. C. FRAENTZEL,
WM. H. CAMFIELD, Jr.